UNITED STATES PATENT OFFICE.

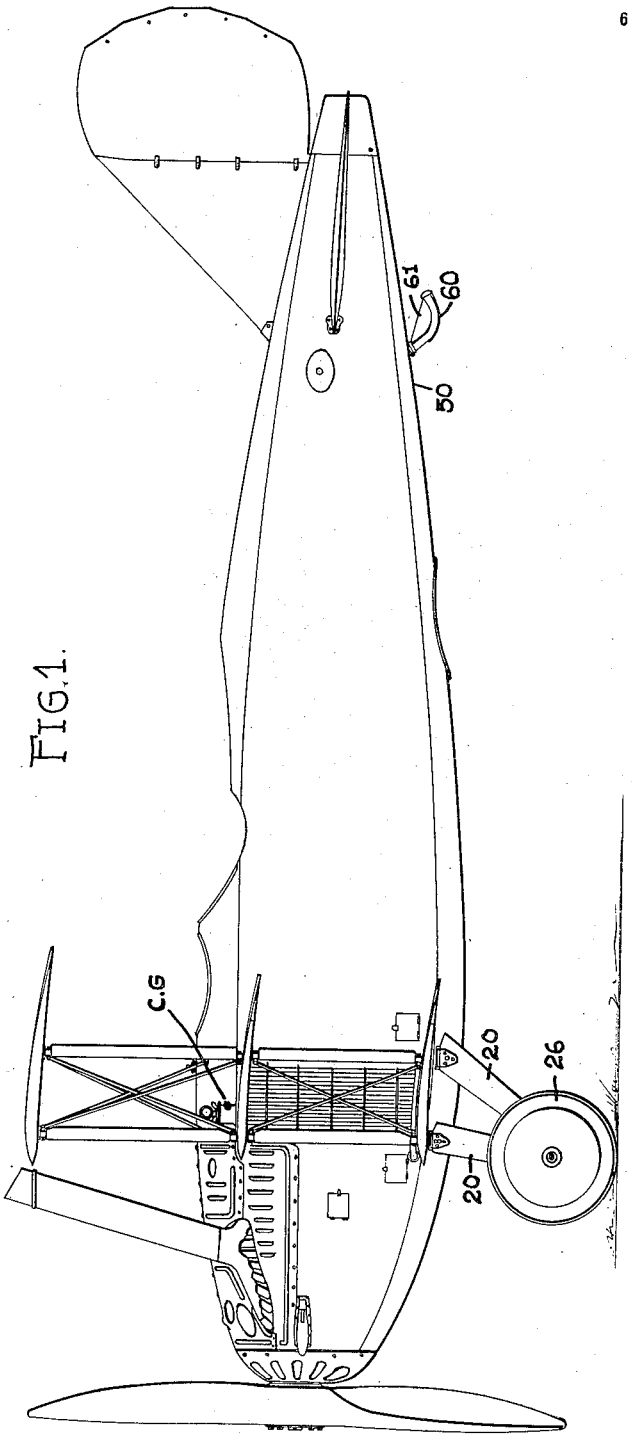

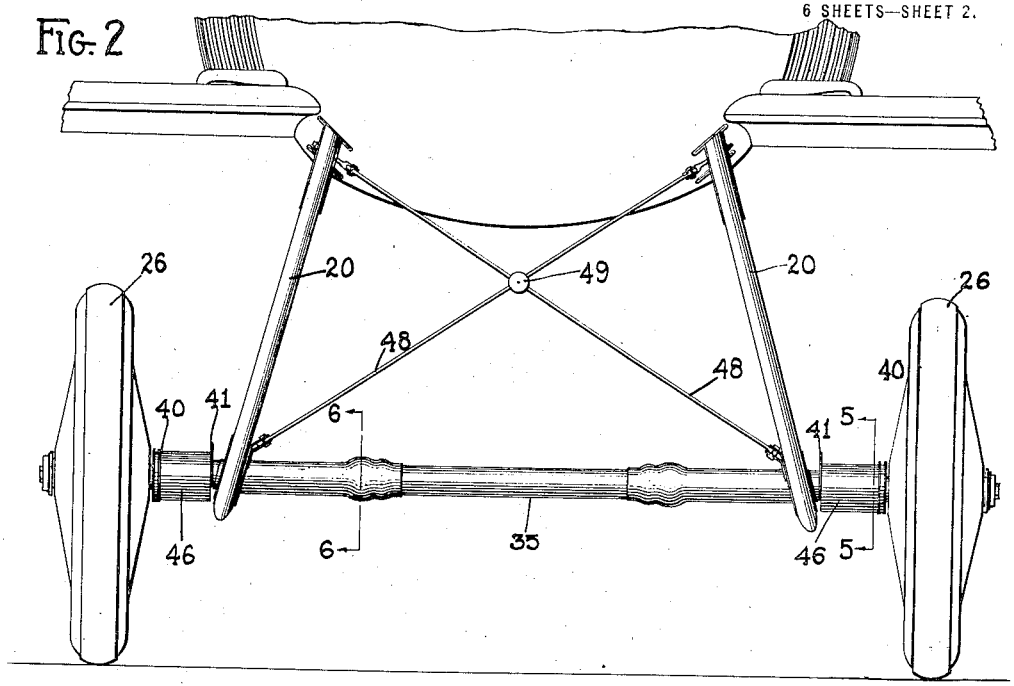
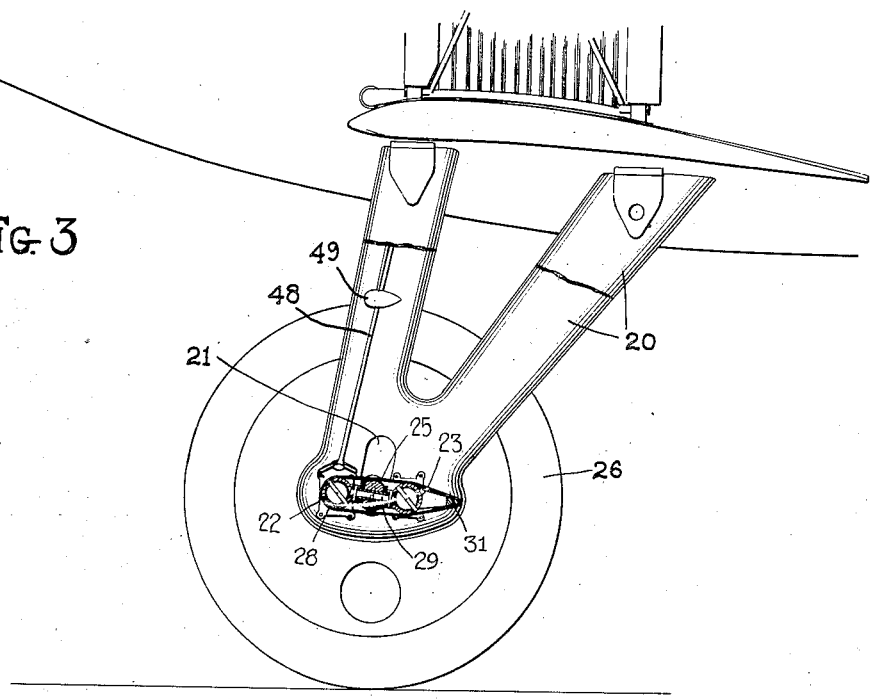

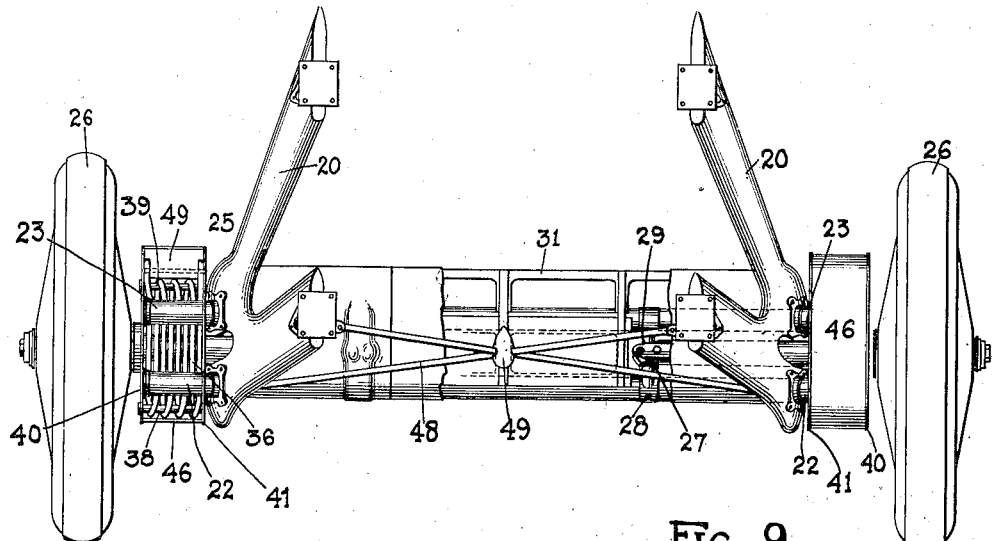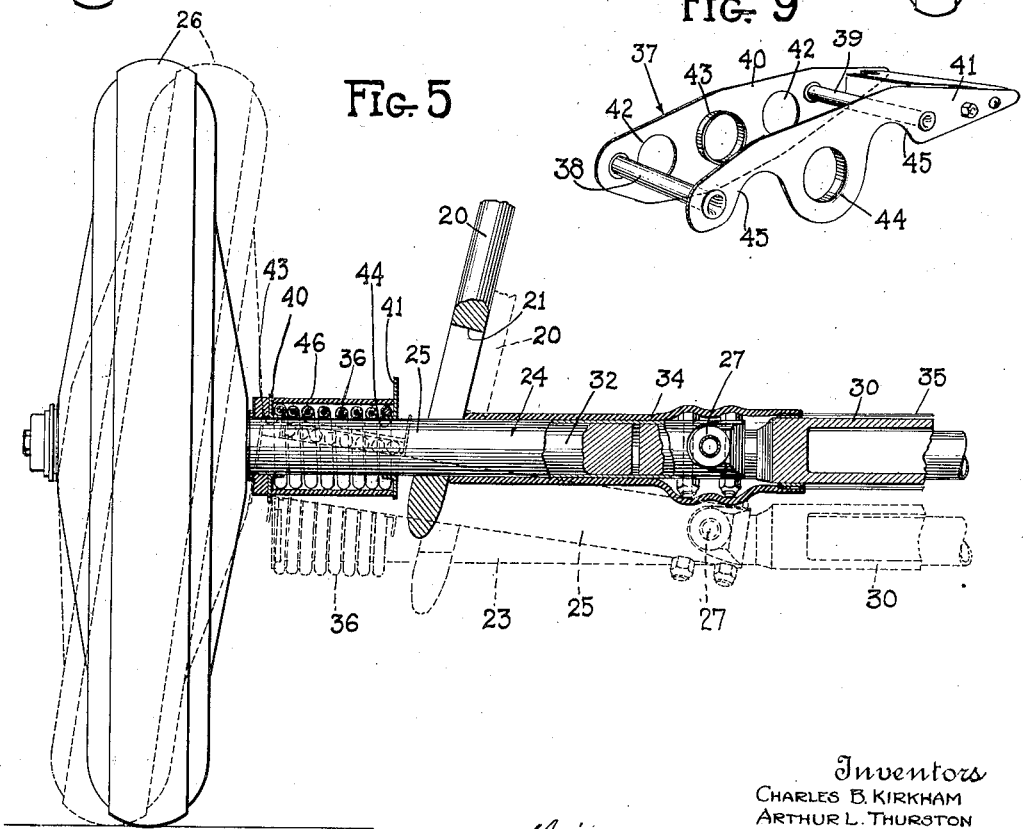

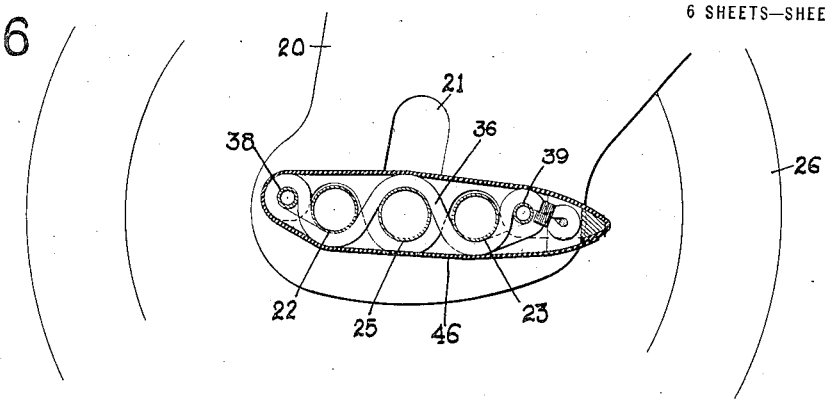
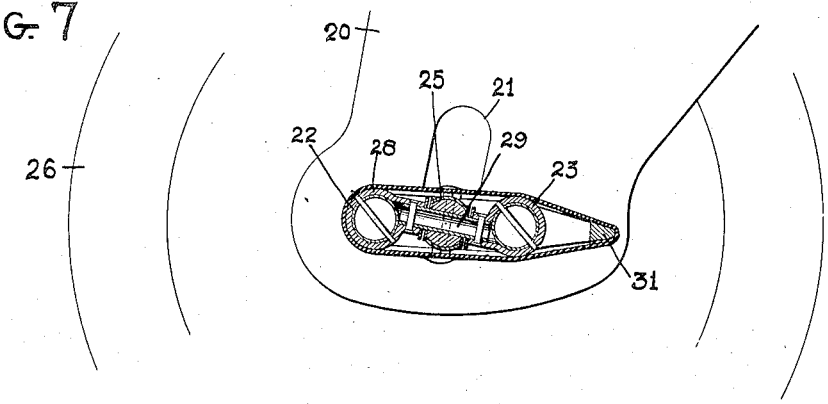
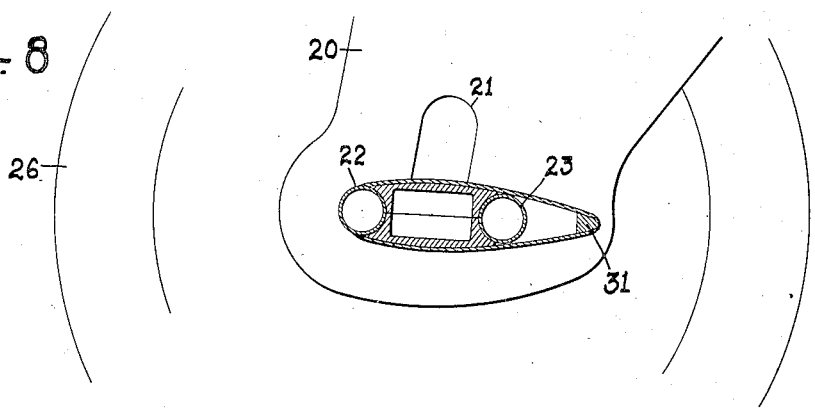

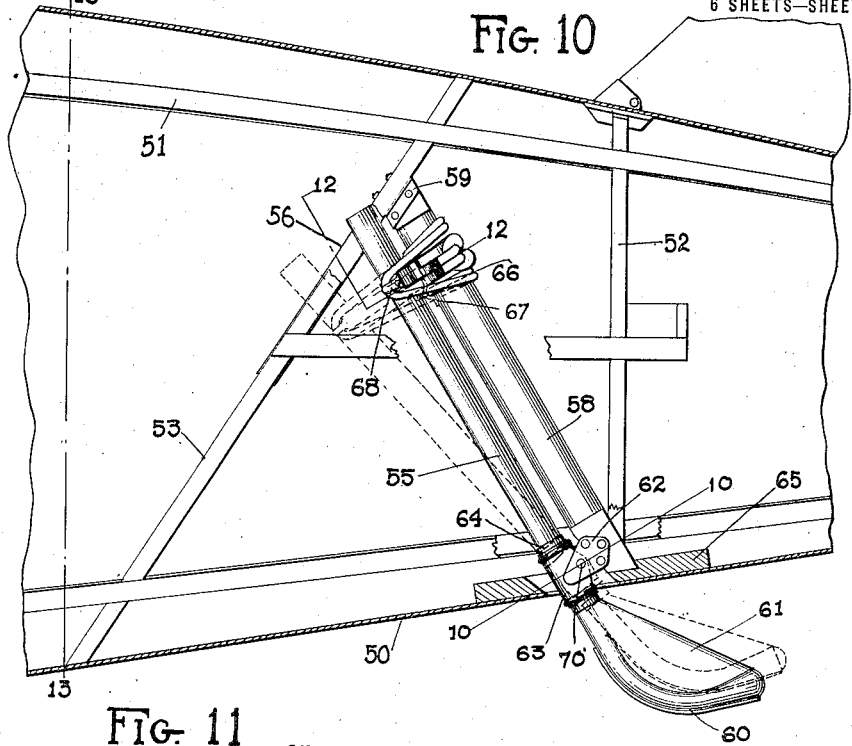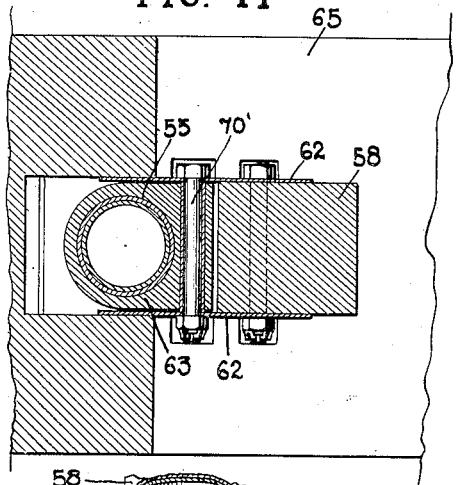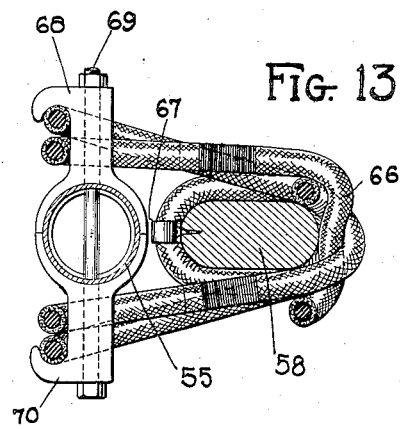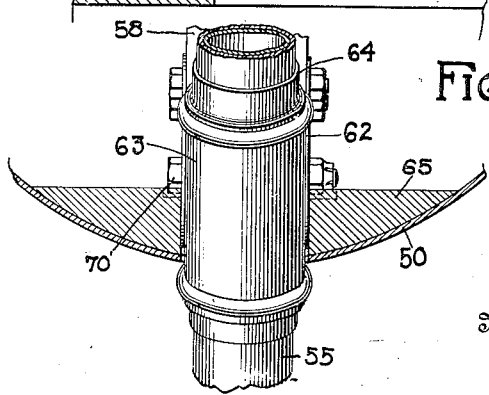

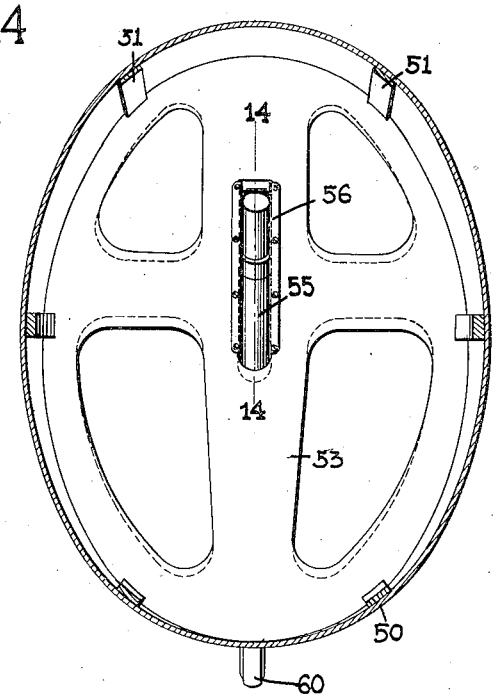
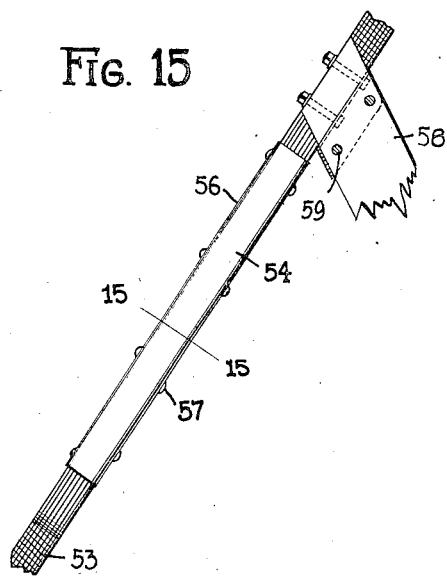
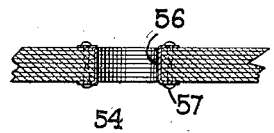

CHARLES B. KIRKHAM, OF GARDEN CITY, AND ARTHUR L. THURSTON, OF HEMPSTEAD, NEW YORK, ASSIGNORS TO CURTISS AEROPLANE AND MOTOR CORPORATION, A CORPORATION OF NEW YORK.

AIRPLANE LANDING-GEAR.

1,392,277.    Specification of Letters Patent.    Patented Sept. 27, 1921.

Application filed October 7, 1918. Serial No. 257,275.

*To all whom it may concern:*

Be it known that we, CHARLES B. KIRKHAM and ARTHUR L. THURSTON, citizens of the United States, residing at Garden City and Hempstead, respectively, in the county of Nassau and State of New York, have invented certain new and useful Improvements in Airplane Landing-Gears, of which the following is a specification.

Our invention relates to improvements in landing gears or chassis for airplanes and more particularly to wheeled landing gears for "land" machines.

In using the term "landing gear" or "landing chassis" we refer not only to that portion of the airplane commonly called the "landing gear" but to that part specifically known as the "tail skid." "Landing gear" in its broad interpretation embraces both of these airplane parts.

An object of the invention is to provide a landing gear construction which is characterized by maximum strength, light weight and minimum head resistance—especially the latter, since the landing gear, while useful in connection with all types of airplanes, is more particularly designed for airplanes of the high speed fighting or reconnaissance types.

The characteristics above mentioned are brought about by improvements in constructional details and refinements rather than by a radical departure or departures from the now more or less conventional design. Excluding the tail skid the landing gear is of the well known V-strut type. Instead of providing a single vertically movable axle member, three axle members are provided. Two of these axle members are rigid and the other non-rigid. The non-rigid axle member comprises separate axle sections carried by and between the rigid axle members, all of which axle members, while the machine is in the air, lie parallel. The axle sections are pivoted respectively at points laterally removed from the longitudinal vertical plane of the fore and aft axis of the craft rather than in the plane of said axis as heretofore. This construction and arrangement minimizes weight and at the same time so positions the landing gear wheels mounted upon the outer exteremities of the movable axle sections that they better withstand the landing shocks incurred in landing upon rough or uneven ground. In other words, the angularity of the wheels is of such magnitude, when fully displaced, as to position them in a manner calculated to completely eliminate the setting up of dissymmetrical or bending stresses in the spokes of the wheels. Moreover, the tread of the wheels thus angularly displaced is brought into more or less flat contact with the ground and the wear upon the tires accordingly lessened.

The three axle members of the landing gear as stated are parallel while the machine is in the air. Being thus positioned they can be streamlined most effectively as a unit. The ends of the movable axle sections project laterally beyond the corresponding ends of the rigid axle members. At their outer ends and closely adjacent the outer faces of the landing gear struts, the movable axle sections are equipped with suitable frames. These frames are movable with the axle sections and normally extended across the rigid axle members beneath which the shock absorber elastics for yieldingly resisting the displacement of the landing gear wheels are laced. The shock absorber elastics are laced beneath the rigid axle members and over the movable axle sections in a fore and aft direction. They are also carried over and around suitable anchorages likewise mounted one in advance of the other and in the longitudinal horizontal plane of the axle members themselves. In this way the elastic chords are elongated or laced longitudinally of the machine to permit of better streamline inclosure, the size of which is determined by the size of the frames within the confines of which the elastics are inclosed. In other words, the arrangement of the shock absorber elastics or elastic chords is such that the full number of chords extend above the movable axle sections and beneath the rigid axle members to yieldingly resist movement or displacement of the landing gear wheels. Heretofore, where a plural number of axle members have been used the elastic chords have been wrapped around the rigid axle members with the disadvantage that only a certain percentage of elasticity of the chords is utilized in resisting the displacement of the landing gear wheels. Further and additional characteristics of the landing gear will be hereinafter more particularly pointed out.

The tail skid portion of the landing gear is characterized by extreme simplicity. It comprises a skid bar inclosed for the major part within the confines of the fuselage or body of the craft. The skid bar is movable in a vertical plane about a transverse axis and turnable about an axis inclined in the same direction as the skid bar itself. The elastic chords (or the equivalent) for yieldingly resisting the displacement of the skid bar are inclosed in the fuselage and so arranged relatively to the skid bar that they not only yieldingly resist its displacement but at the same time return it immediately to a position offering a minimum of resistance should it be displaced momentarily for any cause.

A further characteristic of the tail skid is the relation of the skid bar to the fuselage and more particularly to one or more of the structural elements thereof. In the emobdiment of the invention herein disclosed the fuselage is of the monocoque type in which diaphragms constitute the frame work about which the shell of the fuselage is formed. One of these diaphragms herein constitutes a guide for the skid bar when displaced. This diaphragm is preferably forwardly and downwardly inclined and vertically slotted to receive the inner forward end of the skid bar. The skid bar, in turn is adequately braced by a forwardly and upwardly inclined support which conjointly serves as a rigid anchorage for the tail skid elastics mentioned above. A very minimum of elastic length is required and a very minimum of weight in proportion to strength is the result. This latter fact is brought about not only by the reduction of length in elastic chord required but more so by reason of the fact that only a very minimum number of tail skid parts are needed, some of which parts enter into and constitute actual elements of the fuselage frame work. Furthermore, the relation of the combined fuselage and tail skid parts, is such that the much desired triangulated bracing is retained.

Of the drawings:

Figure 1 is a side elevation of an airplane showing the relation between the wheeled portion and the tail skid portion of the landing gear of our invention;

Fig. 2 is a front end elevation of the landing gear with the tail skid section thereof concealed;

Fig. 3 is a side elevation (partly in section) of that portion of the landing gear illustrated in Fig. 2;

Fig. 4 is a plan view with a portion of the streamline covering removed;

Fig. 5 is an enlarged transverse sectional view detailing the mounting of one of the movable axle sections;

Figs. 6, 7 and 8 are enlarged sectional views taken on the lines 5—5, 6—6 and 7—7 respectively of Fig. 2;

Fig. 9 is a detail perspective view of the frame within which the elastic chords of the wheeled portion of the landing gear are inclosed;

Fig. 10 is a side elevation of the tail skid portion of the landing gear with that portion of the fuselage in the immediate vicinity thereof in section;

Fig. 11 is an enlarged section taken on the line 10—10 of Fig. 10;

Fig. 12 is a fragmentary view, partly in elevation and partly in section, showing the skid bar mounting in the vicinity of its transverse axis;

Fig. 13 is an enlarged section on the line 12—12 of Fig. 10;

Fig. 14 is a section on the line 13—13 of Fig. 10;

Fig. 15 is an enlarged section on the line 14—14 of Fig. 14; and

Fig. 16 is an enlarged section on the line 15—15 of Fig. 15.

As before intimated the principal consideration herein is the elimination of weight without a reduction of strength and with a view to offering a very minimum of head resistance under all operating conditions. These considerations should therefore be borne in mind if a perfect understanding of the advantages of the improved landing gear construction is to be had. The landing gear (excluding the tail skid) in its preferred embodiment is preferably of the V-strut type. It comprises opposed V-struts 20 constructed preferably of wood having its grain so related that a very maximum of strength is secured. The struts 20 (viewed from the front) diverge downwardly from the fuselage or body of the craft. They are enlarged at their outer lower extremities as indicated in Fig. 3 in a fore and aft direction for it is at the lower extremities of the V-struts that greatest strength is needed. The V-struts throughout are of good streamline section and at their lower extremities are further provided with guide openings 21 through which the axle sections of the movable axle members extend.

The axle members, of which there are three, lie parallel throughout their full length when the machine is in the air. Two of these axle members 22 and 23 are rigid and the third 24 non-rigid. The rigid axle members 22 and 23 penetrate the V-struts 20 to which they are rigidly secured by any suitable means. They are preferably located one in advance of and one to the rear of the non-rigid axle member 24 and as hereinafter pointed out constitute a support for the axle sections 25. These axle sections 25 together constitute the movable axle member 24. At their outer ends the axle sections 25 extend laterally beyond the corresponding ends of the rigid axle members 22 and 23 and at their extreme outer ends they support the landing gear wheels 26. At their inner ends the axle sections 25 are pivoted as at 27 about fore and aft axes whereby the axle sections may yield vertically, or substantially vertically when displaced.

The mounting for the axle sections at their inner ends comprises socket fittings 28 and pivot pins 29 (see Fig. 7). The socket fittings embrace the rigid axle members 22 and 23 at points laterally removed from the longitudinal vertical plane of the fore and aft axis of the craft. This mounting not only removes the axes of the movable axle sections from the plane of said axis but it lessens the weight of the landing gear considerably.

Heretofore, where rigid and non-rigid axle members have been used the movable sections of the non-rigid axle member have been pivoted for vertical movement about a common axis usually situated in the longitudinal vertical plane of the fore and aft axis of the craft. This arrangement however is objectionable. Not only is it objectionable because of the increased weight but because of the more important reason that the landing gear wheels, when displaced, have a tendency toward side slipping—especially in landing upon a hill side or upon rough and broken ground. By shortening the movable axle sections as herein pointed out this latter objectionable feature is overcome. The wheels, when displaced, assume an angular position of such magnitude that they prevent all tendency toward side slippage and at the same time better distribute the stresses set up in the wheel spokes. This angular displacement of the wheels is illustrated by dotted lines in Fig. 5.

Between the inner ends of the movable axle sections the rigid axle members are reinforced and cross braced by fairing 30 (see Fig. 8). Rearwardly of the axle member 23 and throughout the full length of said axle member, or rather from strut to strut, the streamline form of the landing gear is carried back to an edge by lightened fairing 31. The fairing in each instance is rigid with the axle members 22 and 23 at all times.

The movable axle sections 25 at their inner ends and in fact throughout substantially their full length are reinforced as at 32 by suitable fillers or cores of wood as in the preferred embodiment the movable axle sections are constructed of metal tubing. The rigid axle members are also constructed of metal tubing and may or may not be reinforced.

By terminating the inner ends of the movable axle sections at points remote one from the other the three axle members can be streamlined as a unit and without mutilation of the desired streamline form under all operating conditions except at points at or near the struts 20. Where the streamline form is broken or mutilated under certain operating conditions the three axle members are inclosed in an elastic fabric covering 34 while intermediate said points the covering for the axle members is inelastic. This latter or inelastic covering, 35, in other words, extends from one to the other of the axle members 25 while the elastic covering 34 incloses the axle members from the ends of the inelastic covering outwardly to the struts. By using elastic covering at the points indicated the vertical displacement of the axle sections due to landing shocks is in no way impaired. In fact, even though elastic covering is used, and the streamline form of the landing gear mutilated under certain operating conditions the cross sectional area of that portion of the landing gear including the axle members is maintained substantially constant while the machine is in the air as under such conditions the rigid and non-rigid axle members lie parallel.

The vertical displacement of the movable axle members 25 is yieldingly resisted by shock absorber elastics 36. These elastics are inclosed in frames 37 of a construction best illustrated in Fig. 9. The elastics it will be noted underlie the rigid axle members 22 and 23 and overlie the movable axle sections 25. They do not under any circumstances pass around either the axle members or the axle sections as it is just such an arrangement that the applicants want to avoid. To so arrange them would require the use of a further number of elastics as only certain of the total number of elastic lengths would be made to serve as a means resisting the vertical displacement of the axle sections 25. To do away with this unnecessary length of elastic chord and at the same time to better lace the chord for decreased resistance two supports or anchorages 38 and 39 are provided for each group of elastics. These supports or anchorages 38 and 39 are carried by and form a part of the frames 37 within which the elastics are inclosed. They are preferably spaced apart a greater distance than are the rigid axle members 22 and 23 to lie one in advance of the axle member 22 and the other to the rear of the axle member 23. As their cross sectional area is considerably smaller than the cross sectional area of said axle members it is obvious that they will readily enter into and in fact better the possibility of obtaining a good streamline form or covering for the elastics.

The frame 37 in addition to the supports 38 and 39 comprises plates 40 and 41. The plate 40 of each frame (there being two, one for each group of elastics) is lightened as at 42 and centrally provided with an opening 43 through which the particular movable axle section 25 with which it is associated extends. The plate 41 of each frame is also provided with an opening 44 through which the axle section extends as the frames 37 are intended to move or yield vertically with said sections. The plates 41 however unlike the plates 40 are cut away or recessed as at 45 to straddle the rigid axle members 22 and 23. Said axle members while they extend beyond the plates 41 terminate short of the plates 40 which are outermost. Normally the frames 37 are held down against the rigid axle members by the lacing of the elastic chords over and around the anchorages or supports 38 and 39 carried by and forming a part of the frames. By extending the rigid axle members laterally out beyond the outside faces of the struts 20 and lacing the elastics beneath the portions thus extended it is obvious that the vertical displacement of the movable axle sections will be resisted by the elastics 36. To better streamline the elastics and at the same time protect them, they are inclosed, like the axle members, throughout a portion of their respective lengths, in elastic fabric 46. The width of the fabric is equal to the distance between the plates 40 and 41. At the trailing edge of the frame fairing 47 is provided to carry the elastic covering rearwardly to an edge.

Another advantage in mounting the elastics in the manner stated, i. e., laterally out beyond the outer faces of the struts, is that the gap between the inner faces of the wheels and the outer faces of the struts is widened. This widening of the gap avoids the formation of air pockets at the points mentioned and as a result cuts down the resistance of the landing gear. The manner of lacing the elastics however is of more importance in that the elastics are laced longitudinally or in a fore and aft direction about a five-point support and in a manner permitting of their inclosure in a covering of good, if not perfect, streamline form.

The wiring used for cross bracing the landing gear or rather the struts 20 of the landing gear is preferably of streamline section. It is arranged in much the usual manner although the wire lengths 48 at their points of intersection are tied together as at 49 to prevent vibration and at the same time reduce the head resistance or drag. The tie 49, which is preferably nothing more nor less than a wooden block through which the wires pass, is also of streamline form.

Referring now to the tail skid portion of the landing gear as distinguished from the wheeled portion thereof it will be noted that the tail skid portion is characterized by a total absence of unnecessary flight resisting surfaces. Its relation to the fuselage or body of the craft is however more or less intimate in that certain of the elements which go to make up the complete fuselage enter into and actually constitute a part of the tail skid *per se*. The fuselage is preferably of the monocoque veneer covered type. The covering designated as 50 incloses the fuselage frame work which preferably comprises stringers 51 to which the veneer covering is fastened and diaphragms or transverse bulk heads 52 and 53 which strengthen the fuselage throughout (only two of the diaphragms are disclosed). The diaphragm 53 is preferably forwardly and downwardly inclined (see Fig. 10) and provided with a vertical slot 54 within which the upper inner end of the skid bar 55 is seated. The length of the slot 54 is determined by the extent of movement accorded the skid bar when displaced to a maximum degree. It is lined throughout by metal bearing plates 56 fastened to the diaphragm as indicated at 57. Directly behind the diaphragm 53 an inclined support 58 is provided. This support is forwardly and upwardly inclined from the bottom of the fuselage aft of the diaphragm and at its upper forward end is fastened to the diaphragm as indicated at 59. Its point of fastening with the diaphragm is preferably at the upper end of the slot 54 at which point it is let through the slot to bear directly against the diaphragm. The opposite end of the support 58 is rigidly fastened at the foot of the diaphragm 52. This diaphragm 52 is vertically disposed rather than diagonally disposed as is the diaphragm 53.

The skid bar 55 is preferably of one piece construction. It comprises a metal tube of a length sufficient to project without the fuselage a sufficient distance to cause its projected end to act as a bearing surface. The projected portion (see Fig. 10) is rearwardly bent as indicated at 60 and reinforced as indicated at 61 by a filler or gusset plate of substantially streamline section. By constructing the filler 61 in the manner stated the resistance offered by the projected end of the skid bar is materially lessened. At the foot of the support 58 and between plates 62 fastened to the support a sleeve-like fitting 63 is provided. The skid bar passes through the sleeve-like fitting and is turnable about an axis parallel with the support 58. Collars 64 secured to the skid bar prevent its vertical displacement relatively to the fitting 63. The sides of the plates 62 bear directly against a stiffening block 65 incorporated in the fuselage structure at the point where the skid bar projects therewithout. This stiffening 65 not only holds the fitting 63 against turning but it also strengthens the fuselage at the foot of the support 58.

At or near the upper forward end of the support 58 elastic chords 66 are provided. These chords are wrapped around the support 58 (see Fig. 13) and securely fastened to it as indicated at 67. By rounding the edges of the support 58 friction is minimized and the life of the elastics accordingly prolonged.

The skid bar 55 at a point near its upper forward end is provided with a fitting 68. This fitting (see Fig. 3) is bolted through the skid bar 59 to prevent its relative turning movement. The elastics 66 engage with the extended portions of the fitting where they are held against sidewise movement by means of hook shaped extensions 70 formed upon the outer extremities of the opposed fitting parts. The elastics 66 being in engagement with the extended portions of the fitting and fastened to the support 58 it is obvious that movement of the skid bar relatively to the support is yieldingly resisted. Moreover, should the skid bar turn due to side swipe in landing it is immediately returned to its normal position (trailing in the air stream) by reason of the fact that the elastics which engage with the opposed projections of the fitting 68 act independently one with the other. That is, the arrangement of the elastics is such that they act conjointly and together when the skid bar is displaced as indicated by the dotted lines of Fig. 10 but separately (the elastics at opposite sides of the skid bar) when the skid bar is turned.

The transverse axis about which the skid bar moves when vertically disposed is defined by a pivot pin 70 arranged to penetrate the side plates 62 and the sleeve-like fitting 63 through which the skid bar passes. This is desirable because of the fact that the connection between the skid bar and support lies closely adjacent the stiffening 65 and at a point where the support is perfectly rigid by reason of its direct association with the diaphragm 52. Furthermore, by locating the pivot axis of the skid bar directly adjacent the opening in the fuselage through which the skid bar extends it is obvious that the opening may be of minimum size consistent with the movement accorded the skid.

The support 58, the diaphragm 53 and the outer shell of the fuselage considered collectively, constitute a substantially triangular support or brace for the tail skid. The diaphragm prevents sidewise displacement of the skid bar, the support constitutes a rigid element to which the skid bar is fastened and at the same time offers a means for fastening the elastics used to limit and resist the displacement of the skid. The pivotal connection between the skid bar and the support lies closely adjacent the foot of the support while the yielding connection between the mentioned elements lies closely adjacent the diaphragm 53. This too tends to strengthen the skid as the forces acting upon the support are adequately distributed in the one instance by the stiffening 65 and the diaphragm 52 and in the other instance by the diagonal diaphragm 53.

The tail skid, for its major part, is completely inclosed in the fuselage or body of the machine. Its extended portion is streamlined in so far as possible while the elastics which resist its movement are so arranged that the projected portion of the skid bar is at all times returned to a fore and aft position should it be momentarily turned.

While the landing gear construction and the tail construction are both of a more or less conventional design it should be noted that the details of each has been worked out with great care and with a view to lightening the landing gear without reducing its factor of safety in the least. Each and every exposed part of the landing gear is of substantially streamline section. Where possible the material heretofore deemed necessary has been reduced. All in all the landing gear is characterized by many extremely desirable features which collectively go to make up an efficient and highly desirable airplane part.

While we have described our invention in detail in its present preferred embodiment, it will be obvious to those skilled in the art after understanding our invention, that various changes and modifications may be made therein without departing from the spirit or scope thereof. We aim in the appended claims to cover all such modifications and changes.

What is claimed is:

1. An aeroplane landing gear including landing gear struts, a non-rigid axle member comprising independently movable axle sections having pivot axes sufficiently removed one from the other to locate one of said axes nearer to one of said struts and the other of said axes nearer to the other of said struts than to the longitudinal vertical plane of the fore and aft axis of the craft, means extending between the landing gear struts to support both pivot axes, wheels mounted upon the outer ends of the axle sections, and means for yieldingly resisting the displacement of the wheels and axle sections.

2. An airplane landing gear including landing gear struts, three axle members, two of which are rigid and the third non-rigid, the non-rigid axle member comprising separate sections pivoted at their inner ends at points laterally removed from the longitudinal vertical plane of the fore and aft axis of the craft, yielding connections respectively between the axle sections and the rigid axle members, rigid connections respectively between the rigid axle members and the struts, and wheels carried by the non-rigid axle member for yielding vertical movement in response to vertically directed shocks.

3. An airplane landing gear including landing gear struts, three axle members, two of which are rigid and interconnect the landing gear struts, and the third of which is non-rigid, and made up of separate axle sections which do not extend from strut to strut although extended laterally beyond the extremities of the remaining two, yielding connections between the sections of the non-rigid axle member and the rigid axle members, and wheels mounted upon the extended ends of the non-rigid axle members for yielding vertical movement in response to vertically directed shocks.

4. An airplane landing gear including landing gear struts, three axle members, two of which are rigid and the third non-rigid, the non-rigid axle member comprising separate axle sections pivoted at their inner ends, the pivot axes of the non-rigid axle sections being widely spaced and located, one axis closely adjacent the inside face of each landing gear strut, yielding connections respectively between the axle sections and the rigid axle members, rigid connections respectively between the rigid axle members and the struts, and wheels mounted upon the outer ends of the yielding axle sections for yielding vertical movement in response to vertically directed shocks.

5. An airplane landing gear including landing gear struts, three axle members, two of which are rigid and the third non-rigid, the non-rigid axle member being longer than the remaining two and intermediately divided to provide independently movable axle sections pivoted at their inner ends between the rigid axle members nearer to the struts than to the longitudinal vertical plane of the fore and aft axis of the craft, yielding connections respectively between the axle sections and the rigid axle members, rigid connections respectively between the rigid axle members and the struts, and wheels mounted upon the extended ends of the yielding axle sections for yielding vertical movement in response to vertically directed shocks.

6. An airplane landing gear including landing gear struts, three axle members, two of which are rigid and the third non-rigid, the non-rigid axle member comprising separate axle sections pivoted at their inner ends between the rigid axle members and at points laterally spaced one from the other, yielding connections respectively between the axle sections and the rigid axle members, an elastic covering inclosing the rigid axle members and the pivoted axle sections throughout the full length of said sections, an inelastic covering inclosing the rigid axle members throughout that portion of their respective lengths defined by the spaced axes of the non-rigid axle section, yielding connections respectively between the axle sections and the rigid axle members, rigid connections respectively between the rigid axle members and the struts, and wheels mounted upon the outer ends of the yielding axle sections for yielding vertical movement in response to vertically directed shocks.

7. An aeroplane landing gear including landing gear struts, a non-rigid axle member comprising independently movable axle sections having pivot axes sufficiently removed one from the other to locate one of said axes nearer to one of said struts and the other of said axes nearer to the other of said struts than to the longitudinal vertical plane of the fore and aft axis of the craft, means extending between the landing gear struts to support both pivot axes, wheels mounted upon the outer ends of the axle sections, means yieldingly resisting the displacement of the wheels and axle sections, an elastic covering for such portions of the connection between the struts as are coextensive with the axle sections, said covering inclosing the axle sections, and a non-elastic covering for the remaining portion of the length of said connection.

8. An airplane landing gear including landing gear struts, three axle members, two of which are rigid and the third non-rigid, the non-rigid axle member being intermediately located between the remaining two, wheels mounted upon the non-rigid axle member, frames carried by the non-rigid axle member, each frame including a fixed support movable vertically with the non-rigid axle member, and shock absorber elastics laced in a fore and aft direction for contact with the non-rigid axle member, the rigid axle members and the supports carried by the frames.

9. An airplane landing gear including landing gear struts, three axle members, two of which are rigid and the third non-rigid, the non-rigid axle member being intermediately located between the remaining two, wheels mounted upon the non-rigid axle member, frames carried by the non-rigid axle member, each frame including side plates and supports, and shock absorber elastics laced in a fore and aft direction between the side plates, the arrangement of the elastics being such that they extend around the supports, beneath the rigid axle members and above the non-rigid axle member to yieldingly resist vertical displacement of the wheels.

10. An airplane landing gear including landing gear struts, three axle members, two of which are rigid and the third non-rigid, the non-rigid axle member being intermediately located between the remaining two, wheels mounted upon the non-rigid axle member, frames carried by the non-rigid axle member, each frame including side plates and supports, the arrangement of the supports being such that they extend parallel with the non-rigid axle member respectively one in advance of and the other to the rear of the rigid axle members, and shock absorber elastics laced in a fore and aft direction around the supports, beneath the rigid axle members and above the non-rigid axle member to yieldingly resist vertical displacement of the wheels.

11. An airplane landing gear including landing gear struts, a non-rigid axle member movable vertically relatively to the landing gear struts, wheels mounted upon the ends of the non-rigid axle member, frames carried by the non-rigid axle member, each frame including side plates and supports, the arrangement of the supports being such that they constitute connections between the side plates respectively in advance of and to the rear of the non-rigid axle member, rigid means carried by the landing gear struts for projection laterally therefrom in proximity to the frames, and shock absorber elastics laced in a fore and aft direction for contact respectively with the supports, the non-rigid axle member and a means projecting laterally out from the struts.

12. An airplane landing gear including landing gear struts, an axle movable relatively to the landing gear struts, rigid means connecting with the landing gear struts and projecting out laterally therefrom, supports carried by the non-rigid axle member respectively in advance of and to the rear of said last mentioned means, and shock absorber elastics laced around the supports above the non-rigid axle member and beneath said intermediately located means.

13. An aeroplane landing gear including landing gear struts, shock absorber elastics, fixed supports for the shock absorber elastics mounted respectively in advance of and to the rear of the axle, movable supports for the shock absorber elastics mounted respectively in advance of and to the rear of the fixed supports, the elastics being extended beneath the fixed supports, above the axle and around the movable supports, and wheels upon the ends of the movable axle.

14. An aeroplane landing gear including landing gear struts, an axle movable relatively to the landing gear struts, shock absorber elastics, fixed supports for the shock absorber elastics mounted respectively in advance of and to the rear of the axle, movable supports likewise mounted respectively in advance of and to the rear of the axle, the shock absorber elastics being laced about both the supports and the axle, and landing gear wheels mounted upon the ends of the axle.

15. In an airplane landing gear, landing gear struts, an axle movable relatively to the struts, fixed supports carried by the struts, supports movable with the axle, and shock absorber elastics laced beneath the fixed supports, over the axle and around the movable supports.

16. In an airplane landing gear, landing gear struts, an axle movable relatively to the struts, fixed supports carried by the struts respectively fore and aft of the axle, supports movable with the axle and shock absorber elastics laced in a fore and aft direction beneath the fixed supports, over the axle and around the movable supports.

17. In an airplane, the combination with the fuselage, of a diaphragm inclosed within the fuselage as a structural element thereof, a support connecting with the diaphragm at one end, a skid bar extended at one end without the fuselage, and yielding and pivotal connections respectively between the skid and the support.

18. In an airplane, the combination with the fuselage, of a forwardly and downwardly inclined diaphragm inclosed within the fuselage, a forwardly and upwardly inclined support connecting with the diaphragm, a skid bar extended at one end without the fuselage, and yielding and pivotal connections respectively between the skid bar and the support.

19. In an airplane, the combination with the fuselage, of a vertically slotted diaphragm inclosed within the fuselage, a support connecting with the diaphragm, a skid bar having its inner end seated within the slot of the diaphragm and its outer end extended without the fuselage, and yielding and pivotal connections respectively between the skid bar and the support.

20. In an airplane, the combination with the fuselage, of a diaphragm inclosed within the fuselage, a support connecting with the diaphragm, a forwardly and upwardly inclined skid bar inclosed for the major part within the fuselage, and yielding and pivotal connections respectively between the skid bar and the support, the arrangement of the connections being such that they lie respectively adjacent the diaphragm and the bottom of the fuselage near the opening therein through which the skid bar extends.

21. In a landing gear for airplanes, a skid bar turnable about an axis extending longitudinally thereof, a support for the skid bar inclosed within the fuselage and a yielding connection between the skid bar and the support so arranged that the skid bar is immediately returned to a given position should it for any cause be momentarily displaced.

22. In a landing gear for airplanes, a skid bar turnable about an axis extending longitudinally thereof and movable vertically about an axis extending transversely thereof, a support for the skid bar, and a yielding connection between the skid bar and support arranged to yieldingly resist its vertical displacement about its transverse axis and to immediately return it to a given position should it be momentarily turned from such position for any cause.

23. In a landing gear for airplanes, a skid bar turnable about an axis extending longitudinally thereof, a support for the skid bar, a yielding connection between the skid bar and the support, and a fitting mounted at the foot of the support and in the immediate vicinity of the opening in the fuselage through which a skid bar extends, the sides of the fitting being in bearing contact with the sides of the opening whereby the skid bar is held against lateral displacement without interference with its turning movement above the axis extending longitudinally thereof.

24. In a landing gear for airplanes, a skid bar inclosed for the major part within the body of the craft and extended at one end therewithout, a support for the skid bar inclosed in the body of the craft, a fitting inclosed in the body of the craft and mounted at the foot of the support, said fitting including a bearing sleeve through which the skid bar extends, a yielding connection between the skid bar and the support inclosed within the body of the craft and spaced above said fitting, and means for returning the skid bar to a fore and aft position should it be momentarily turned relatively to the bearing sleeve.

25. In an airplane landing gear, the combination with the fuselage, of longitudinally separated diaphragms inclosed in the fuselage as structural elements thereof, a skid bar, a support for the skid bar connecting with both diaphragms and yielding and pivotal connections respectively between the skid bar and support, the arrangement of the connections being such that the pivotal connection lies directly adjacent one of the diaphragms and the yielding connection directly adjacent the other.

26. A landing gear for aeroplanes including a skid bar having a transverse pivot axis and an axis of rotation extending longitudinally of the skid bar together with elastic means yieldingly resisting vertical displacement of the skid bar and at the same time yieldingly holding the skid bar against rotation about its longitudinal axis.

27. A landing gear for aeroplanes including a skid bar having a transverse axis and an axis of rotation extending longitudinally of the skid bar, a cross-arm rigid with the skid bar, and elastic means engaging the cross-arm to yieldingly resist vertical displacement of the skid bar about its transverse axis and at the same time yieldingly holding the skid bar against rotation about its longitudinal axis.

28. In an aeroplane, the combination with the fuselage, of a skid bar inclosed for the major part within the fuselage, an inclined support for the skid bar likewise inclosed in the fuselage, yielding and pivotal connections respectively between the skid bar and the support and means inside the fuselage and constituting a structural element thereof for rigidly bracing the inclined support.

29. A landing gear for aeroplanes including a skid bar having a portion of its length inclosed within and a portion of its length extended without the fuselage or body of the craft, that portion of the skid bar extending without the body being intermediately bent to present a relatively flat bearing surface for the skid, together with fairing in the form of a streamlined brace carried by the bent portion of the skid bar to prevent it from bending further when in contact with the ground and at the same time to reduce the resistance which the exposed portion of the skid offers to the air.

In testimony whereof we hereunto affix our signatures.

CHARLES B. KIRKHAM.
ARTHUR L. THURSTON.